US012428958B2

(12) United States Patent
Wang et al.

(10) Patent No.: US 12,428,958 B2
(45) Date of Patent: Sep. 30, 2025

(54) HYDROGEOLOGICAL DRILLING-TYPE DETECTION EQUIPMENT

(71) Applicants: Qinghai 906 Engineering Survey and Design Institute Co. LTD, Qinghai (CN); Qinghai Bureau of Environmental Geology Exploration, Qinghai (CN); Qinghai Institute of Geological and Environmental Survey, Qinghai (CN)

(72) Inventors: Shengbin Wang, Qinghai (CN); Zexue Qi, Qinghai (CN); Fenglin Wang, Qinghai (CN); Zhen Zhao, Qinghai (CN); Xiaoran Chai, Qinghai (CN); Guoqiang Zhang, Qinghai (CN); Long Chen, Qinghai (CN); Youjing Yuan, Qinghai (CN); Haicong Kou, Qinghai (CN); Shanhu Xiao, Qinghai (CN); Shaokang Yang, Qinghai (CN); Jianhui Wang, Qinghai (CN)

(73) Assignees: Qinghai 906 Engineering Survey and Design Institute Co. LTD, Xining (CN); Qinghai Bureau of Environmental Geology Exploration, Xining (CN); Qinghai Institute of Geological and Environmental Survey, Xining (CN)

( * ) Notice: Subject to any disclaimer, the term of this patent is extended or adjusted under 35 U.S.C. 154(b) by 90 days.

(21) Appl. No.: 18/485,679

(22) Filed: Oct. 12, 2023

(65) Prior Publication Data

US 2024/0125181 A1 Apr. 18, 2024

(30) Foreign Application Priority Data

Oct. 13, 2022 (CN) .......................... 202211253961.4

(51) Int. Cl.
*E21B 49/02* (2006.01)
*E21B 3/02* (2006.01)
(Continued)

(52) U.S. Cl.
CPC ................ *E21B 49/02* (2013.01); *E21B 3/02* (2013.01); *E21B 7/027* (2013.01); *E21B 19/081* (2013.01); *E21B 33/127* (2013.01); *E21B 49/081* (2013.01)

(58) Field of Classification Search
CPC .................................. E21B 49/02; G01N 1/08
See application file for complete search history.

(56) References Cited

FOREIGN PATENT DOCUMENTS

CN 208996630 U * 6/2019
CN 209444303 U 9/2019
(Continued)

OTHER PUBLICATIONS

First Office Action for China Application No. 202211253961.4, mailed Jul. 14, 2023.

*Primary Examiner* — Robert E Fuller
(74) *Attorney, Agent, or Firm* — Pilloff Passino & Cosenza LLP; Rachel Pilloff; Sean Passino (57) ABSTRACT

Hydrogeological drilling-type detection equipment includes a detection support frame, where the detection support frame is fixedly connected with a detection box body with a through hole, the through hole is communicated with an inside of the detection box body, a drilling box body is arranged inside the through hole, a lifting assembly is arranged inside the detection box body, the drilling box body is slidably connected with the through hole through the lifting assembly, a bottom end of the drilling box body is provided with a multifunctional drilling assembly provided with a blocking assembly, each of four corners of a bottom end of the detection support frame is provided with a moving (Continued)

wheel, the detection support frame is provided with a stable support assembly, the stable support assembly is correspondingly arranged with the moving wheel, and one side of the detection support frame is fixedly connected with an armrest.

10 Claims, 6 Drawing Sheets

(51) Int. Cl.
*E21B 7/02* (2006.01)
*E21B 19/081* (2006.01)
*E21B 33/127* (2006.01)
*E21B 49/08* (2006.01)

(56) References Cited

FOREIGN PATENT DOCUMENTS

| | | | |
|---|---|---|---|
| CN | 210948488 U | * | 7/2020 |
| CN | 211954754 U | | 11/2020 |
| CN | 112067353 A | | 12/2020 |
| CN | 214576750 U | * | 11/2021 |
| CN | 214660066 U | | 11/2021 |
| CN | 215953022 U | * | 3/2022 |
| CN | 215985246 U | * | 3/2022 |
| CN | 114544244 A | | 5/2022 |
| CN | 114878207 A | | 8/2022 |

\* cited by examiner

HYDROGEOLOGICAL DRILLING-TYPE DETECTION EQUIPMENT

CROSS-REFERENCE TO RELATED APPLICATIONS

This application claims priority of Chinese Patent Application No. 202211253961.4, filed on Oct. 13, 2022, the entire contents of which are incorporated herein by reference.

TECHNICAL FIELD

The application relates to the technical field of geological exploration, and in particular to hydrogeological drilling-type detection equipment.

BACKGROUND

Hydrogeology is a branch of geology, which refers to various changes and movements of groundwater in nature. It mainly studies the distribution and formation law of groundwater, the physical properties and chemical composition of groundwater, groundwater resources and their rational utilization, the adverse effects of groundwater on engineering construction and mining and its prevention and control. In view of hydrogeology, it is usually necessary to use special detection equipment for hole sampling.

Hydrogeological detection equipment in the prior art can usually only perform a single exploration sampling operation, including separate soil sampling and separate water sampling, which has a small application range. Meanwhile, the current blocking method (sealing method) for water sampling is to inject weighted mud between a drilling tool and the hole wall for blocking, and the controllable accuracy of cement setting time is poor, and the cement is easily diluted and washed away by water flow. Moreover, because the cement block is hard and brittle, it is often disturbed and destroyed by the drilling tool in the later drilling, and the blocking effect (sealing effect) cannot be guaranteed.

Therefore, there is an urgent need for hydrogeological drilling-type detection equipment to solve the above problems.

SUMMARY

The objective of the present application is to provide hydrogeological drilling-type detection equipment to solve the problems in the prior art.

In order to achieve the above objective, the application provides the following scheme. The application provides hydrogeological drilling-type detection equipment, which includes a detection support frame, where the detection support frame is fixedly connected with a detection box body. A through hole is formed in a middle of a bottom end of the detection box body. The through hole is communicated with an inside of the detection box body. A drilling box body is arranged inside the through hole. A lifting assembly is arranged inside the detection box body; and the drilling box body is slidably connected with the through hole through the lifting assembly. A bottom end of the drilling box body is provided with a multifunctional drilling assembly. The multifunctional drilling assembly is provided with a blocking assembly. The blocking assembly and the multifunctional drilling assembly are correspondingly arranged. Each of four corners of a bottom end of the detection support frame is provided with a moving wheel. The detection support frame is provided with a stable support assembly. The stable support assembly is correspondingly arranged with the moving wheel, and one side of the detection support frame is fixedly connected with an armrest.

Optionally, the multifunctional drilling assembly includes a rotating rod. The rotating rod is rotatably connected to a middle of the bottom end of the drilling box body. A first motor is fixedly connected to a top end inside the drilling box body. A top end of the rotating rod extends into the drilling box body and is fixedly connected with an output shaft of the first motor. An outer side wall of the rotating rod is fixedly connected with a spiral blade, a bottom end of the rotating rod is fixedly connected with a drilling bit, a water sampling assembly is arranged on the drilling bit, and the blocking assembly is located on the rotating rod.

Optionally, an outer side wall of the drilling bit is provided with a plurality of sampling channels at equal intervals along a circumferential direction. The water sampling assembly includes sealing plugs. The sealing plugs are respectively slidably connected inside the sampling channels. A second motor is fixedly connected inside the rotating rod. An output shaft of the second motor extends into the drilling bit and is fixedly connected with one end of the first threaded rod. An other end of the first threaded rod is rotatably connected with a bottom end inside the drilling bit, and a slider is threadedly connected on the first threaded rod. A limit rod is fixedly connected inside the drilling bit. The slider is slidably connected with the limit rod. An outer side wall of the slider is hinged with ends of a plurality of connecting rods along a circumferential direction. The sealing plugs extend into the drilling bit and are respectively hinged with other ends of the connecting rods.

Optionally, one end of each of the sampling channels, away from the slider, is fixedly connected with a filter screen.

Optionally, threads are arranged on the outer side wall of the rotating rod, and a sealing pipe is threadedly connected with the threads. The blocking assembly includes a plurality of annular rubber sealing rings fixedly connected to an outer side wall of the sealing pipe. An air pump is fixedly connected inside the detection box body. An output end of the air pump is fixedly communicated with one end of an air pipe. A main air transmission channel and a plurality of auxiliary air transmission channels are arranged inside a pipe wall of the sealing pipe. The auxiliary air transmission channels are respectively and fixedly communicated with the annular rubber sealing rings and all communicated with the main air transmission channel. Another end of the air pipe extends into the pipe wall of the sealing pipe and is fixedly communicated with the main air transmission channel.

Optionally, an outer diameter of a cross section of the sealing pipe is smaller than an outer diameter of a cross section of the spiral blade.

Optionally, the lifting assembly includes two support columns. The two support columns are fixedly connected inside the detection box body. The two support columns are arranged in parallel. A transverse plate is fixedly connected between the two support columns. A middle of the transverse plate is rotatably connected with a threaded conveying pipe. A second threaded rod is threadedly connected inside the threaded conveying pipe. A bottom end of the second threaded rod is fixedly connected with a connecting plate, and a bottom end of the connecting plate is fixedly connected with a top end of the drilling box body. Two ends of the connecting plate are respectively slidably connected with the two support columns. A top end of the transverse plate is fixedly connected with a third motor. An output shaft of the third motor is fixedly connected with a gear. An outer side wall of the threaded conveying pipe is fixedly connected with an annular tooth groove, and the gear is meshed with the annular tooth groove.

Optionally, a top end of the detection box body is provided with a threaded hole. The second threaded rod is threadedly connected with the threaded hole. The top end of the detection box body is fixedly connected with an L-shaped support rod. A top end of the L-shaped support rod is fixedly connected with a plumb bob, and the plumb bob is correspondingly arranged with the second threaded rod.

Optionally, the stable support assembly includes a plurality of L-shaped support plates. One end of each of the L-shaped support plates is hinged on an outer side wall of the detection support frame, and an other end of the each of the L-shaped support plates is fixedly connected with a bottom plate. A bottom end of the bottom plate and a bottom end of the moving wheel are located in a same horizontal plane, and a plurality of round holes are formed in the bottom plate, and a limit nail is arranged inside each of round holes.

Optionally, the L-shaped support plates and the detection support frame are all provided with limit screw holes, and each of the limit screw holes is threadedly connected with a limit bolt.

The application has following technical effects.

According to the hydrogeological drilling-type detection equipment provided by the application, the multifunctional sampling assembly is arranged, so that single equipment can be used for exploration sampling of water samples and soil samples at the same time, and the application range is wide; and meanwhile, the blocking effect when the water sample are taken is ensured by arranging the blocking assembly, so that groundwater is prevented from flowing out.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

In the following, the technical scheme in the embodiments of the application will be clearly and completely described with reference to the attached drawings. Obviously, the described embodiment is only a part of the embodiments of the application, but not the whole embodiment. Based on the embodiments in the present application, all other embodiments obtained by ordinary technicians in the field without creative labor belong to the scope of protection of the present application.

To make the above objectives, features and advantages of the present application more obvious and easier to understand, the present application will be further described in detail with the attached drawings and specific embodiments.

Referring to FIG. 1 to FIG. 6, the application provides hydrogeological drilling-type detection equipment, which includes a detection support frame 1. A detection box body 2 is fixedly connected to the detection support frame 1. A through hole is formed in a middle of a bottom end of the detection box body 2. The through hole is communicated with an inside of the detection box body 2. A drilling box body 3 is arranged inside the through hole. A lifting assembly is arranged inside the detection box body 2. The drilling box body 3 is slidably connected with the through hole through the lifting assembly. A multifunctional drilling assembly is arranged at a bottom end of the drilling box body 3. The multifunctional drilling assembly is provided with a blocking assembly, and the blocking assembly and the multifunctional drilling assembly are correspondingly arranged. Each of four corners of a bottom end of the detection support frame 1 is provided with a moving wheel 4. The detection support frame 1 is provided with a stable support assembly. The stable support assembly is correspondingly arranged with the moving wheel 4. One side of the detection support frame 1 is fixedly connected with an armrest (a handle) 5.

Figure 1:
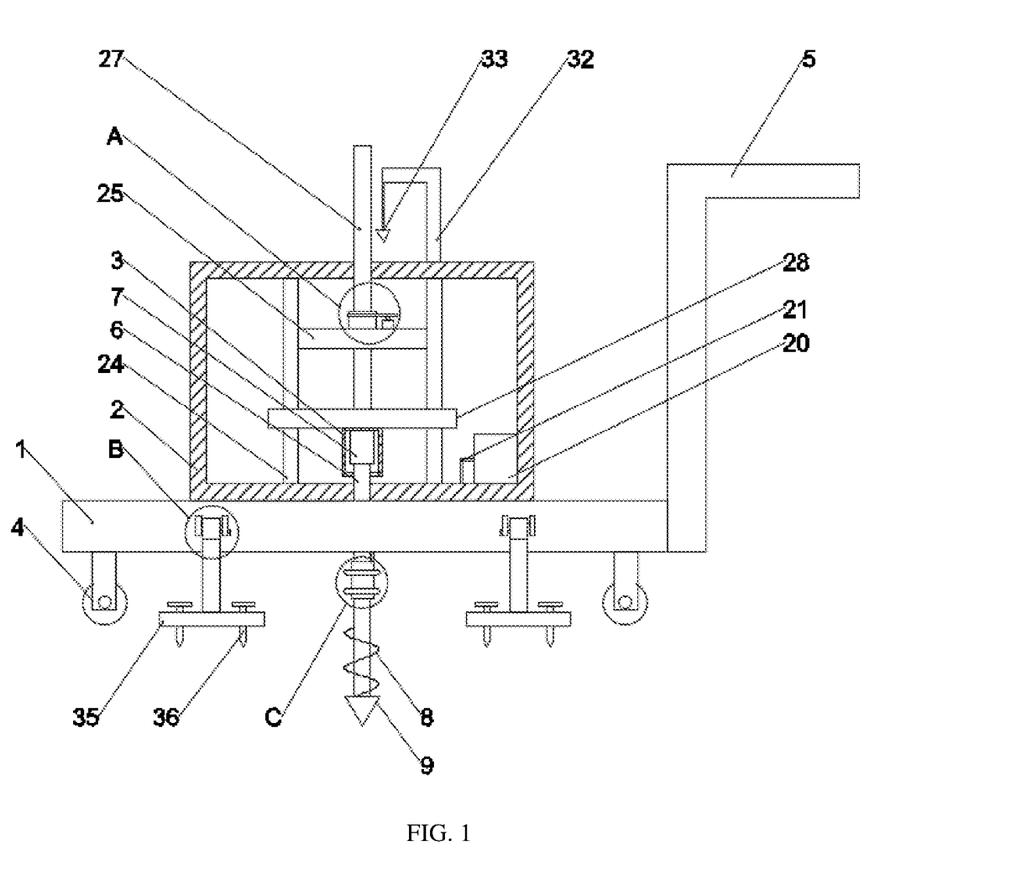
FIG. 1 is a schematic structural diagram of the present application.
Figure 2:
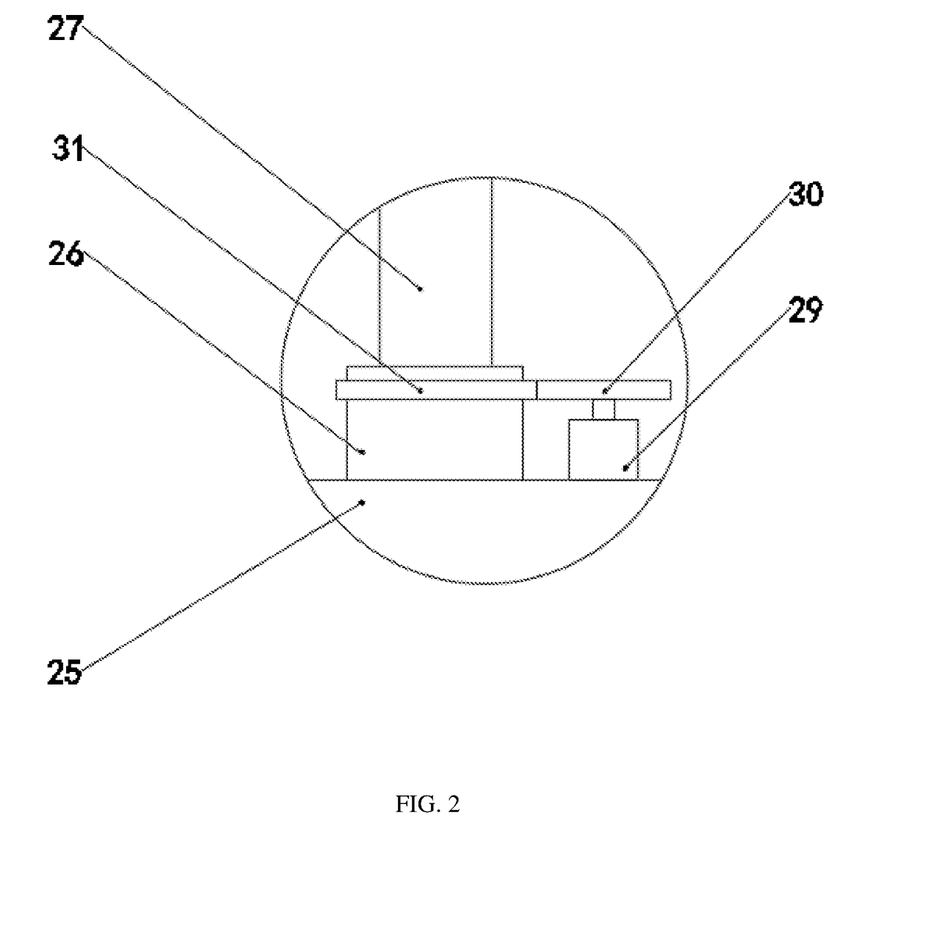
FIG. 2 is an enlarged view of at A in FIG. 1.
Figure 3:
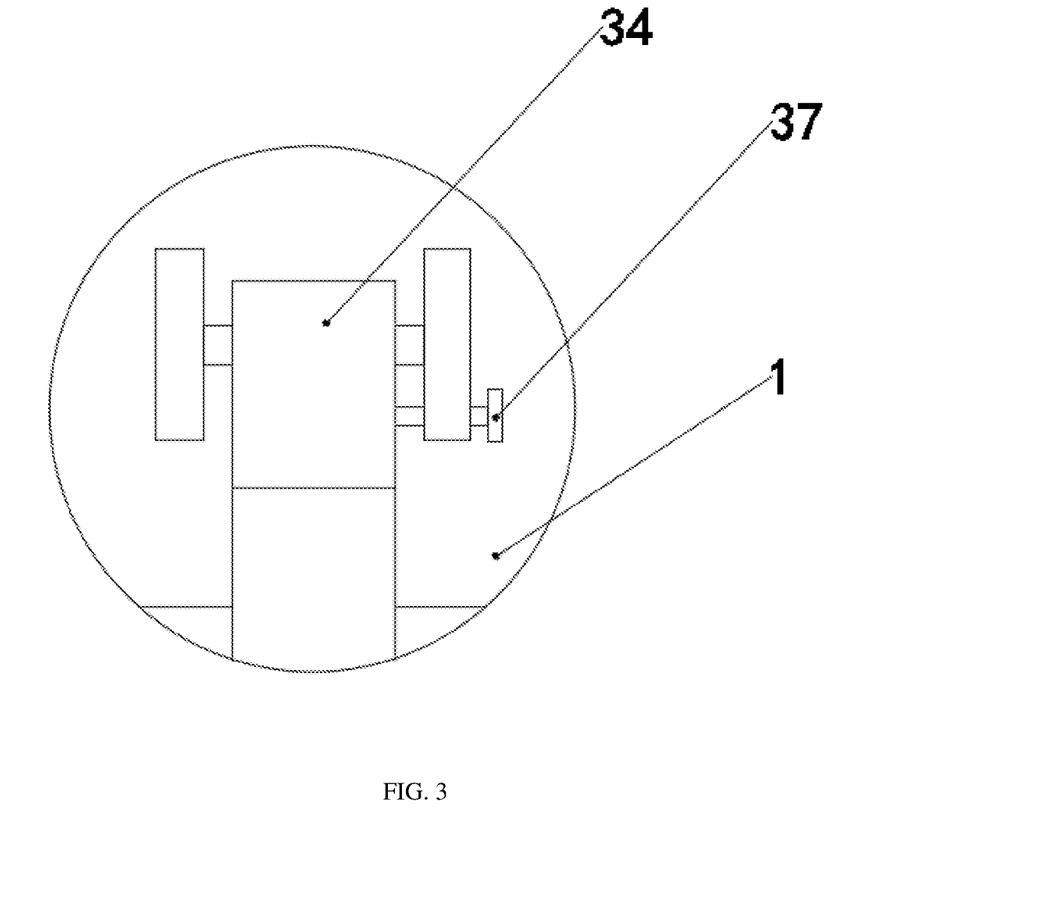
FIG. 3 is an enlarged partial view at B in FIG. 1.
Figure 4:
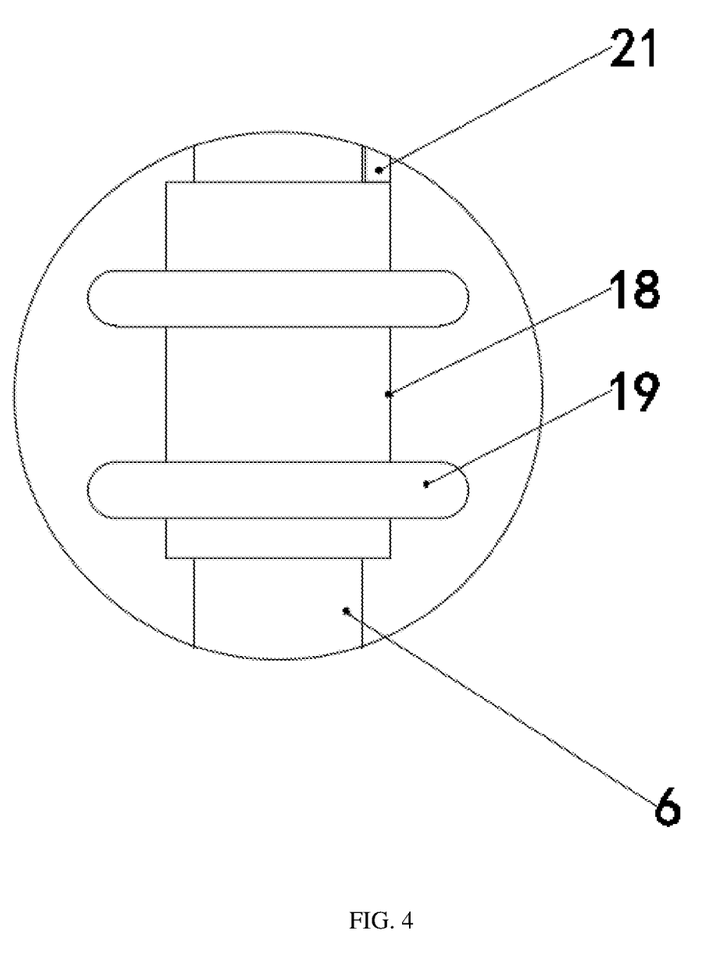
FIG. 4 is an enlarged partial view at C in FIG. 1.
Figure 5:
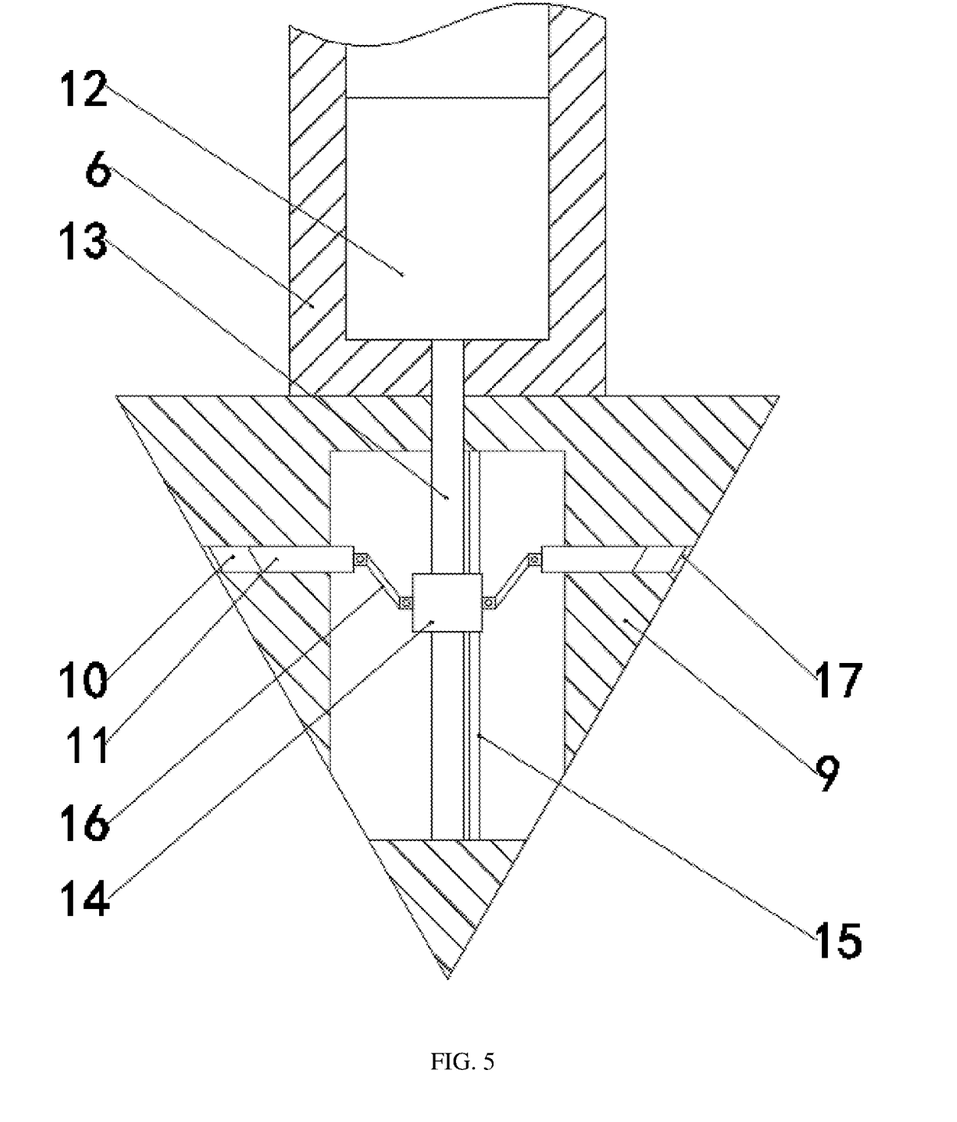
FIG. 5 is a schematic diagram of an internal structure of a drilling bit of the present application.

In an embodiment, the multifunctional drilling assembly includes a rotating rod 6. The rotating rod 6 is rotatably connected to a middle of the bottom end of the drilling box body 3. A first motor 7 is fixedly connected to a top end inside the drilling box body 3. A top end of the rotating rod 6 extends into the drilling box body 3 and is fixedly connected with an output shaft of the first motor 7. An outer side wall of the rotating rod 6 is fixedly connected with a spiral blade 8, a bottom end of the rotating rod 6 is fixedly connected with a drilling bit 9, a water sampling assembly is arranged on the drilling bit 9, and the blocking assembly is located on the rotating rod 6.

By arranging the multifunctional drilling assembly, single equipment allows exploration and sampling of water samples and soil samples at the same time, and the application range is wide.

In an embodiment, an outer side wall of the drilling bit 9 is provided with a plurality of sampling channels 10 at equal intervals along a circumferential direction. The water sampling assembly includes sealing plugs 11. The sealing plugs 11 are respectively slidably connected inside the sampling channels 10. A second motor 12 is fixedly connected inside the rotating rod 6. An output shaft of the second motor 12 extends into the drilling bit 9 and is fixedly connected with one end of the first threaded rod 13. An other end of the first threaded rod 13 is rotatably connected with a bottom end inside the drilling bit 9, and a slider 14 is threadedly connected on the first threaded rod 13. A limit rod 15 is fixedly connected inside the drilling bit 9. The slider 14 is slidably connected with the limit rod 15. An outer side wall of the slider 14 is hinged with ends of a plurality of connecting rods 16 along a circumferential direction. The sealing plugs 11 extend into the drilling bit 9 and are respectively hinged with other ends of the connecting rods 16.

The water samples are sampled by arranging the water sampling assembly.

In an embodiment, one end of each of the sampling channels 10, away from the slider 14, is fixedly connected with a filter screen 17.

The filter screen 17 filters the sediment, ensures the cleanliness of the water samples, and avoids the internal blockage of the detection equipment.

Figure 6:
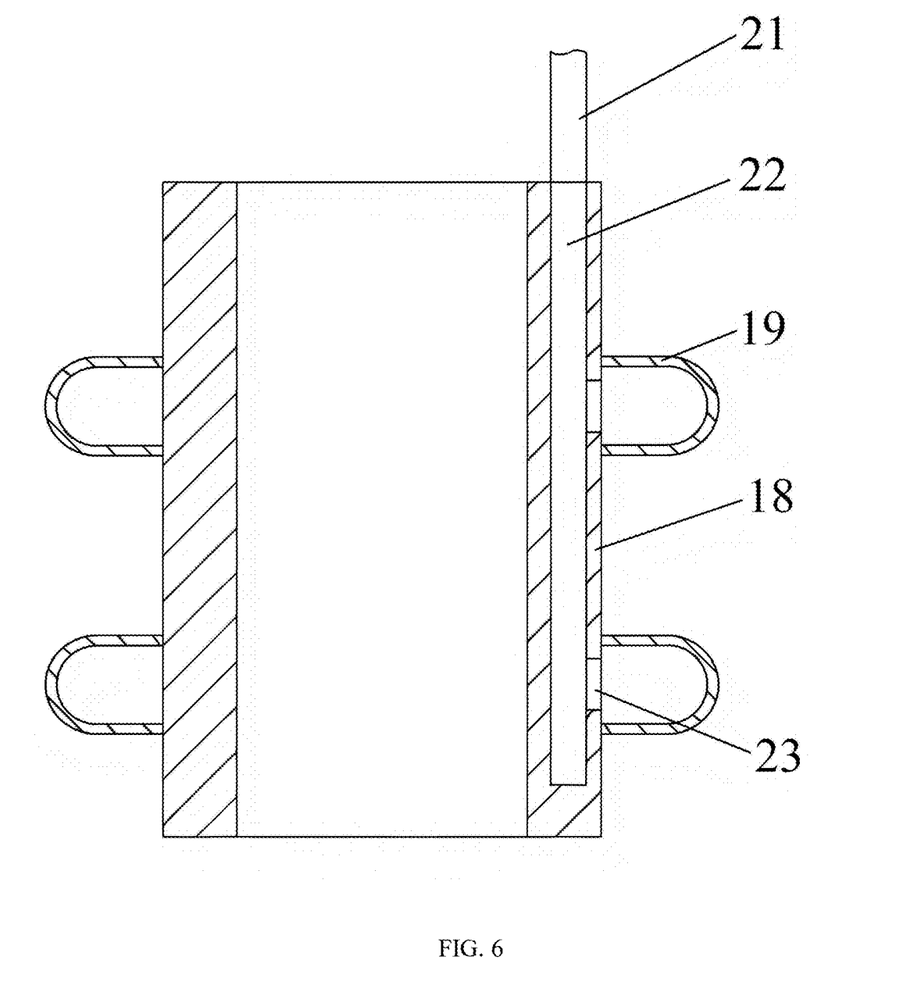
FIG. 6 is an internal structural diagram of a pipe wall of a sealing pipe of the present application.

In an embodiment, threads are arranged on the outer side wall of the rotating rod 6, and a sealing pipe 18 is threadedly connected with the threads. The blocking assembly includes a plurality of annular rubber sealing rings 19 fixedly connected to an outer side wall of the sealing pipe 18. An air pump 20 is fixedly connected inside the detection box body 2. An output end of the air pump 20 is fixedly communicated with one end of an air pipe 21. A main air transmission channel 22 and a plurality of auxiliary air transmission channels 23 are arranged inside a pipe wall of the sealing pipe 18. The auxiliary air transmission channels 23 are respectively and fixedly communicated with the annular rubber sealing rings 19 and all communicated with the main air transmission channel 22. An other end of the air pipe 21 extends into the pipe wall of the sealing pipe 18 and is fixedly communicated with the main air transmission channel 22.

By arranging the blocking assembly, when water samples are sampled, the air pump 20 inflates the inside of the annular rubber sealing rings 19, and after inflation, the annular rubber sealing rings 19 expand and abut against the drilled channel, thus blocking the channel, and at the same time, the rotating rod 6 can continue to rotate downwards and deeply under the condition that the threadedly connected sealing pipe 18 is blocked.

In an embodiment, an outer diameter of a cross section of the sealing pipe 18 is smaller than an outer diameter of a cross section of the spiral blade 8.

In an embodiment, the lifting assembly includes two support columns 24. The two support columns 24 are fixedly connected inside the detection box body 2. The two support columns 24 are arranged in parallel. A transverse plate 25 is fixedly connected between the two support columns 24. A middle of the transverse plate 25 is rotatably connected with a threaded conveying pipe 26. A second threaded rod 27 is threadedly connected inside the threaded conveying pipe 26. A bottom end of the second threaded rod 27 is fixedly connected with a connecting plate 28, and a bottom end of the connecting plate 28 is fixedly connected with a top end of the drilling box body 3. Two ends of the connecting plate 28 are respectively slidably connected with the two support columns 24. A top end of the transverse plate 25 is fixedly connected with a third motor 29. An output shaft of the third motor 29 is fixedly connected with a gear 30. An outer side wall of the threaded conveying pipe 26 is fixedly connected with an annular tooth groove 31, and the gear 30 is meshed with the annular tooth groove 31.

The lifting assembly is arranged to drive the drilling box body 3 to move stably, so as to realize different-depth drilling.

In an embodiment, a top end of the detection box body 2 is provided with a threaded hole. The second threaded rod 27 is threadedly connected with the threaded hole. The top end of the detection box body 2 is fixedly connected with an L-shaped support rod 32. A top end of the L-shaped support rod 32 is fixedly connected with a plumb bob 33, and the plumb bob 33 is correspondingly arranged with the second threaded rod 27.

The verticality of the second threaded rod 27 is adjusted by arranging the plumb bob 33 to ensure the verticality of the drilling of the detection equipment.

In an embodiment, the stable support assembly includes a plurality of L-shaped support plates 34. One end of each of the L-shaped support plates 34 is hinged on an outer side wall of the detection support frame 1, and an other end of the each of the L-shaped support plates 34 is fixedly connected with a bottom plate 35. A bottom end of the bottom plate 35 and a bottom end of the moving wheel 4 are located in a same horizontal plane, and a plurality of round holes are formed in the bottom plate 35, and a limit nail 36 is arranged inside each of round holes.

By arranging the bottom plate 35, the limit nail 36 is nailed into the ground to ensure the stability of the detection equipment during the drilling process.

In an embodiment, the L-shaped support plates 34 and the detection support frame 1 are all provided with limit screw holes, and each of the limit screw holes is threadedly connected with a limit bolt 37.

The stability of the L-shaped support plates 34 after spreading is ensured by setting the limit bolt 37.

The application provides hydrogeological drilling-type detection equipment. When in use, the equipment is pushed to a designated position, the vertical position of the second threaded rod 27 on the equipment is ensured by the plumb bob 33, so that the verticality of drilling holes is ensured, and the bottom plate 35 is abutted with the ground by rotating the hinged L-shaped support plates 34, and the limit nail 36 is nailed into the ground to support the equipment stably.

For sampling soil samples, the first motor 7 drives the rotating rod 6 and the drilling bit 9 to rotate, and the third motor 29 drives the gear 30 to rotate. The gear 30 drives the threaded conveying pipe 26 to rotate through the meshed annular tooth groove 31, and when the threaded conveying pipe 26 rotates, the second threaded rod 27 is driven to move downward, and the second threaded rod 27 drives the drilling box body 3 to move downward through the transverse plate 25 to realize drilling operation, and the soil samples are taken out through the spiral blade 8 to complete the sampling of the soil samples.

As for sampling the water samples, the drilling bit 9 extends into the underground water, and the air is transported by the air pump 20 and the air pipe 21 to inflate a plurality of annular rubber sealing rings 19, and the annular rubber sealing rings 19 are in contact with the inner wall of the drilled channel after being inflated, thus blocking and waterproofing the channel and preventing the underground water from being ejected along the gap. At the same time, the annular rubber sealing rings 19 are in contact with the inner wall of the channel after being inflated, and the rotating rod 6 is threadedly connected with the sealing pipe 18. After the sealing pipe 18 is limited by the annular rubber sealing rings 19, the rotating rod 6 may still continue to drill deeper downward by rotation. For water intake operation, the second motor 12 drives the first threaded rod 13 to rotate, and the first threaded rod 13 drives the slider 14 to move vertically. When the slider 14 moves vertically, the hinged connecting rods 16 drive the sealing plugs 11 to move inward. When the sealing plugs 11 move, the extracted water enters the sampling channels 10 through the filter screen 17, so as to take water samples.

In the description of the present application, it should be understood that orientation or positional relationships indicated by the terms "vertical", "transverse", "up", "down", "front", "back", "left", "right", "vertical", "horizontal", "top", "bottom", "inside", "outside", etc. are based on the orientation or positional relationships shown in the accompanying drawings, solely for the convenience of describing the present application, rather than indicating or implying that the device or component referred to must have a specific orientation, be constructed and operated in a specific orientation, therefore it cannot be understood as a limitation of the present application.

The above described embodiments are only a description of the preferred method of the present application and do not limit the scope of the present application. Without departing from the design spirit of the present application, various modifications and improvements made by ordinary technical persons in the field to the technical solution of the present application should fall within the scope of protection defined by the claims of the present application.

What is claimed is:

1. Hydrogeological drilling-type detection equipment, comprising a detection support frame, wherein the detection support frame is fixedly connected with a detection box body, a through hole is formed in a middle of a bottom end of the detection box body, the through hole is communicated with an inside of the detection box body, a drilling box body is arranged inside the detection box body, a lifting assembly is arranged inside the detection box body, the drilling box body is slidable relative to the through hole through the lifting assembly, a bottom end of the drilling box body is provided with a multifunctional drilling assembly, the multifunctional drilling assembly is provided with a blocking assembly, each of four corners of a bottom end of the detection support frame is provided with a moving wheel, the detection support frame is provided with a stable support assembly, and one side of the detection support frame is fixedly connected with a handle.

2. The hydrogeological drilling-type detection equipment according to claim 1, wherein the multifunctional drilling assembly comprises a rotating rod, the rotating rod is rotatably connected to a middle of the bottom end of the drilling box body, a first motor is fixedly connected to a top end inside the drilling box body, a top end of the rotating rod extends into the drilling box body and is fixedly connected with an output shaft of the first motor, an outer side wall of the rotating rod is fixedly connected with a spiral blade, a bottom end of the rotating rod is fixedly connected with a drilling bit, a water sampling assembly is arranged on the drilling bit, and the blocking assembly is located on the rotating rod.

3. The hydrogeological drilling-type detection equipment according to claim 2, wherein an outer side wall of the drilling bit is provided with a plurality of sampling channels at equal intervals along a circumferential direction, the water sampling assembly comprises sealing plugs, the sealing plugs are respectively slidably connected inside the sampling channels, a second motor is fixedly connected inside the rotating rod, an output shaft of the second motor extends into the drilling bit and is fixedly connected with one end of a first threaded rod, an other end of the first threaded rod is rotatably connected with a bottom end inside the drilling bit, and a slider is threadedly connected on the first threaded rod, a limit rod is fixedly connected inside the drilling bit, the slider is slidably connected with the limit rod, an outer side wall of the slider is hinged with ends of a plurality of connecting rods along a circumferential direction, the sealing plugs extend into the drilling bit and are respectively hinged with other ends of the connecting rods.

4. The hydrogeological drilling-type detection equipment according to claim 3, wherein one end of each of the sampling channels, away from the slider, is fixedly connected with a filter screen.

5. The hydrogeological drilling-type detection equipment according to claim 3, wherein threads are arranged on the outer side wall of the rotating rod, and a sealing pipe is threadedly connected with the threads, the blocking assembly comprises a plurality of annular rubber sealing rings fixedly connected to an outer side wall of the sealing pipe, an air pump is fixedly connected inside the detection box body, an output end of the air pump is fixedly communicated with one end of an air pipe, a main air transmission channel and a plurality of auxiliary air transmission channels are arranged inside a pipe wall of the sealing pipe, the auxiliary air transmission channels are respectively and fixedly communicated with the annular rubber sealing rings and all communicated with the main air transmission channel, an other end of the air pipe extends into the pipe wall of the sealing pipe and is fixedly communicated with the main air transmission channel.

6. The hydrogeological drilling-type detection equipment according to claim 5, wherein an outer diameter of a cross section of the sealing pipe is smaller than an outer diameter of a cross section of the spiral blade.

7. The hydrogeological drilling-type detection equipment according to claim 1, wherein the lifting assembly comprises two support columns, the two support columns are fixedly connected inside the detection box body, the two support columns are arranged in parallel, a transverse plate is fixedly connected between the two support columns, a middle of the transverse plate is rotatably connected with a threaded conveying pipe, a second threaded rod is threadedly connected inside the threaded conveying pipe, a bottom end of the second threaded rod is fixedly connected with a connecting plate, and a bottom end of the connecting plate is fixedly connected with a top end of the drilling box body, two ends of the connecting plate are respectively slidably connected with the two support columns, a top end of the transverse plate is fixedly connected with a third motor, an output shaft of the third motor is fixedly connected with a gear, an outer side wall of the threaded conveying pipe is fixedly connected with an annular tooth groove, and the gear is meshed with the annular tooth groove.

8. The hydrogeological drilling-type detection equipment according to claim 7, wherein a top end of the detection box body is provided with a threaded hole, the second threaded rod is threadedly connected with the threaded hole, the top end of the detection box body is fixedly connected with an L-shaped support rod, a top end of the L-shaped support rod is fixedly connected with a plumb bob, and the plumb bob is correspondingly arranged with the second threaded rod.

9. The hydrogeological drilling-type detection equipment according to claim 1, wherein the stable support assembly comprises a plurality of L-shaped support plates, one end of each of the L-shaped support plates is hinged on an outer side wall of the detection support frame, and an other end of the each of the L-shaped support plates is fixedly connected with a bottom plate, a bottom end of the bottom plate and a bottom end of the moving wheel are located in a same horizontal plane, and a plurality of round holes are formed in the bottom plate, and a limit nail is arranged inside each of the plurality of round holes.

10. The hydrogeological drilling-type detection equipment according to claim 9, wherein the L-shaped support plates and the detection support frame are all provided with limit screw holes, and each of the limit screw holes is internally threadedly connected with a limit bolt.

\* \* \* \* \*